(12) United States Patent
Heindl

(10) Patent No.: US 6,814,369 B2
(45) Date of Patent: Nov. 9, 2004

(54) AIRBAG MODULE

(75) Inventor: Ralf Heindl, Aschaffenburg (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/152,892

(22) Filed: May 21, 2002

(65) Prior Publication Data

US 2002/0175500 A1 Nov. 28, 2002

(30) Foreign Application Priority Data

May 22, 2001 (DE) ..................... 201 08 594 U

(51) Int. Cl.⁷ ............................................. B60R 21/16
(52) U.S. Cl. ................................................. 280/728.2
(58) Field of Search ..................................... 280/728.2

(56) References Cited

U.S. PATENT DOCUMENTS

| | | | | |
|---|---|---|---|---|
| 5,388,858 A | * | 2/1995 | Cuevas | 280/728.2 |
| 5,580,080 A | * | 12/1996 | Soderquist et al. | 280/728.2 |
| 5,857,697 A | * | 1/1999 | Heilig | 280/731 |
| 6,361,065 B1 | * | 3/2002 | Frisch | 280/728.2 |
| 6,435,540 B1 | * | 8/2002 | Durre | 280/728.2 |
| 6,439,599 B1 | * | 8/2002 | Laue et al. | 280/731 |
| 6,464,247 B1 | | 10/2002 | Laue | |
| 6,592,141 B1 | * | 7/2003 | Dancasius et al. | 280/728.2 |
| 2002/0117836 A1 | * | 8/2002 | Asic et al. | 280/728.2 |

FOREIGN PATENT DOCUMENTS

| | | |
|---|---|---|
| DE | 29816923 | 1/1999 |
| DE | 29816925 | 1/1999 |
| GB | 2341359 | 3/2000 |
| WO | WO 00/15470 | 3/2000 |

* cited by examiner

Primary Examiner—Son T Nguyen
(74) Attorney, Agent, or Firm—Tarolli, Sundheim, Covell & Tummino L.L.P.

(57) ABSTRACT

The invention relates to an airbag module comprising a gas generator that is mounted in the airbag module by means of at least one elastic element. The elastic element is a hollow profile closed as seen in cross-section and has a circumferential wall a radial outer side of which lies against the gas generator on the one hand, and against a holding part on a module side on the other hand.

14 Claims, 3 Drawing Sheets

AIRBAG MODULE

TECHNICAL FIELD

The invention relates to an airbag module.

BACKGROUND OF THE INVENTION

Known airbag modules comprise a gas generator that is mounted in the module by means of at least one elastic element so as to be uncoupled in terms of vibration.

So far, such airbag modules are exclusively provided in steering wheels and they offer the advantage that the relatively heavy gas generator is mounted so as to be uncoupled from the rest of the module in terms of vibration, as a result of which the tendency of the steering wheel to vibrate decreases. The gas generator can also be configured as a so-called vibration absorber. The uncoupling of the gas generator is achieved by means of the elastic element(s) with which the gas generator is held in the module. The elastic element has to meet high demands, for example, it has to be as uniformly elastic as possible over the operating temperature range of −40° C. to +80° C. and it also has to be aging-resistant. Moreover, the attachment to the gas generator has to be very secure, with, for example, vulcanization being conceivable.

BRIEF SUMMARY OF THE INVENTION

The invention provides an airbag module with a simply structured elastic element that meets the above-mentioned requirements.

This is achieved in an airbag module which comprises a holding part and a gas generator that is mounted to the holding part by means of at least one elastic element. The elastic element is a hollow profile closed as seen in cross-section and has a circumferential wall a radial outer side of which lies against the gas generator on the one hand, and against a holding part on a module side on the other hand. A hollow profile has the advantage that, due to its geometry, it adapts very well to contours since it can also yield considerably inwards as compared with a solid O-ring or a rubber pad, as a result of which its elasticity can be increased.

Preferably, the elastic element completely surrounds the gas generator, and moreover, it can seal off a gap between a holding part on the module and the gas generator, so that the elastic element has a double function (uncoupled mounting on the holding part and sealing). The seal serves to ensure that no gas can escape from the module in the area of the holder of the gas generator.

According to a preferred embodiment, the elastic element has the shape of a circumferentially closed ring, which increases the tightness.

On its inside, the elastic element can also be foam-filled in order for its stability to be increased. However, an increase in stability can also be achieved in that at least one elastic support element is incorporated into the elastic element. This support element is preferably inserted into the elastic element (for example, during its production) or into openings in the elastic element.

One embodiment makes provision that the elastic element assumes a circular cross-section in the non-installed state, that is to say, it is a hollow profile that is very simple to make.

A first embodiment of the invention proposes that the gas generator has a radial holding flange comprising upper and lower sides, with one elastic element each lying against the upper and lower sides, respectively. Holding parts are provided by means of which the elements are pressed towards each other, in order to clamp the holding flange between them. An advantage here is the simple assembly and the easy manufacture of the elastic elements.

A second embodiment makes provision that there is only one single elastic element, it extending from the upper side of the holding flange of the gas generator and along the circumferential edge as far as to the lower side of the holding flange. Holding parts are provided by means of which the elastic element is pressed against the upper and lower sides, in order to clamp the holding flange between them. The main advantage of this embodiment is that only one single elastic element is provided, which also extends radially outside of the circumferential edge.

Preferably, one of the holding parts that effectuate the clamping of the elastic element is a pot-shaped diffuser that surrounds the gas generator, in other words, a part that is provided anyway and that, with the clamping of the elastic element or elements, acquires an additional function.

In the airbag module according to the invention, the hollow profile is stressed by the gas generator perpendicular to its lengthwise extension, that is to say, as seen in the cross-section, perpendicular to its lengthwise extension. In the state of the art, there are elastic elements in the form of short bushings but these bushings are stressed in the axial direction so that their resilience is limited. Moreover, these bushings only constitute punctual supports and cannot provide a sealing function.

DETAILED DESCRIPTION OF THE PREFERRED EMBODIMENTS

Figure 1:
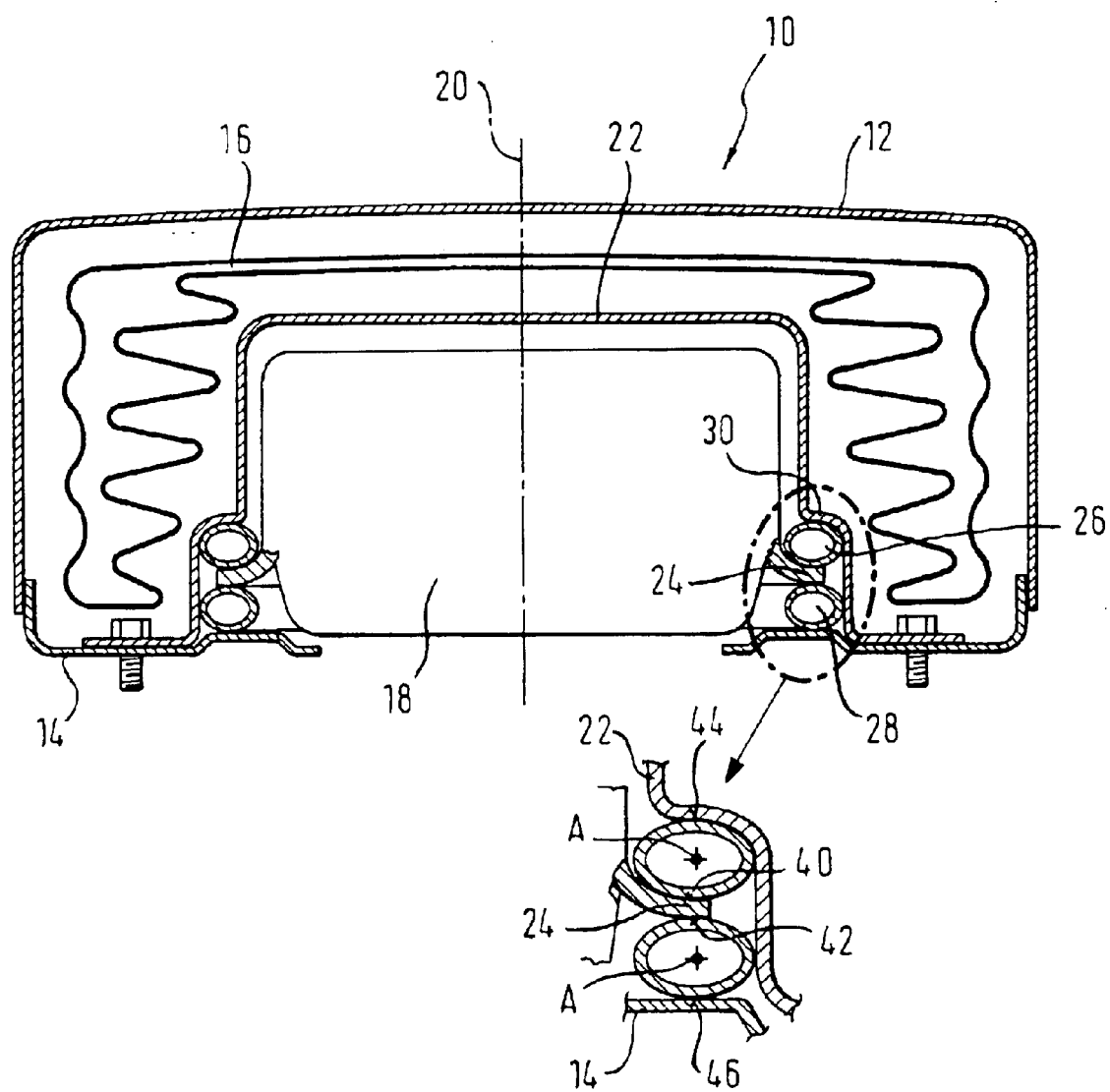
FIG. 1 shows a cross-sectional view of a gas generator according to the invention in a first embodiment.

FIG. 1 shows an airbag module 10, accommodated in the steering wheel of a vehicle, that has a pot-shaped outer housing 12 the rear side of which is closed by a generator holding plate 14 or a similar part. An airbag 16 as well as a cylindrical gas generator 18 with a middle axis 20 are accommodated inside the airbag module. Between the airbag 16 and the gas generator 18, there is a pot-shaped diffuser 22 that is screwed with the generator holding plate 14. The gas generator has a radial, surrounding flange 24 on the upper side of which there is provided an elastic element 26 in the form of a hollow profile with a closed circumference and extending in the nature of a ring along the flange 24. The cross-section of the hollow profile is circular, i.e. the outer or circumferential wall defining the profile is closed in the circumferential direction. A second elastic element 28, which has the same geometry as the elastic element 26, lies against the lower side of the flange 24. Via the elastic elements 26, 28, the gas generator 18 is mounted in the module 10 so as to be uncoupled in terms of vibration. The elastic elements 26, 28 are compressed in the radial direction in that a shoulder 30 of the diffuser 22 presses on the element 26, thus clamping the two elements as well as the flange 24 between itself and the holding plate 14. Consequently, the elements 26, 28 are installed in such a way that their longitudinal axis A, which runs like a ring parallel to the flange 24, is positioned perpendicular to the axis 20.

The enlarged section in FIG. 1 shows that each element 26, 28 lies with the radial outer side of its circumferential wall on a first circumferential section 40 or 42 on the flange 24 and on an opposite section 44 or 46 on the diffuser 22 and the holding plate 14, respectively. This means that, in the installed state, the elements 26, 28 are loaded and prestressed perpendicular to their lengthwise extension and, during operation, they are also loaded perpendicular to their lengthwise extension, that is to say, radially. In the embodiment according to FIG. 1, the elements 26, 28 are pressed onto each other by the diffuser 22 and the generator holding plate 14 in order to clamp the holding flange 24 between them.

Figure 2:
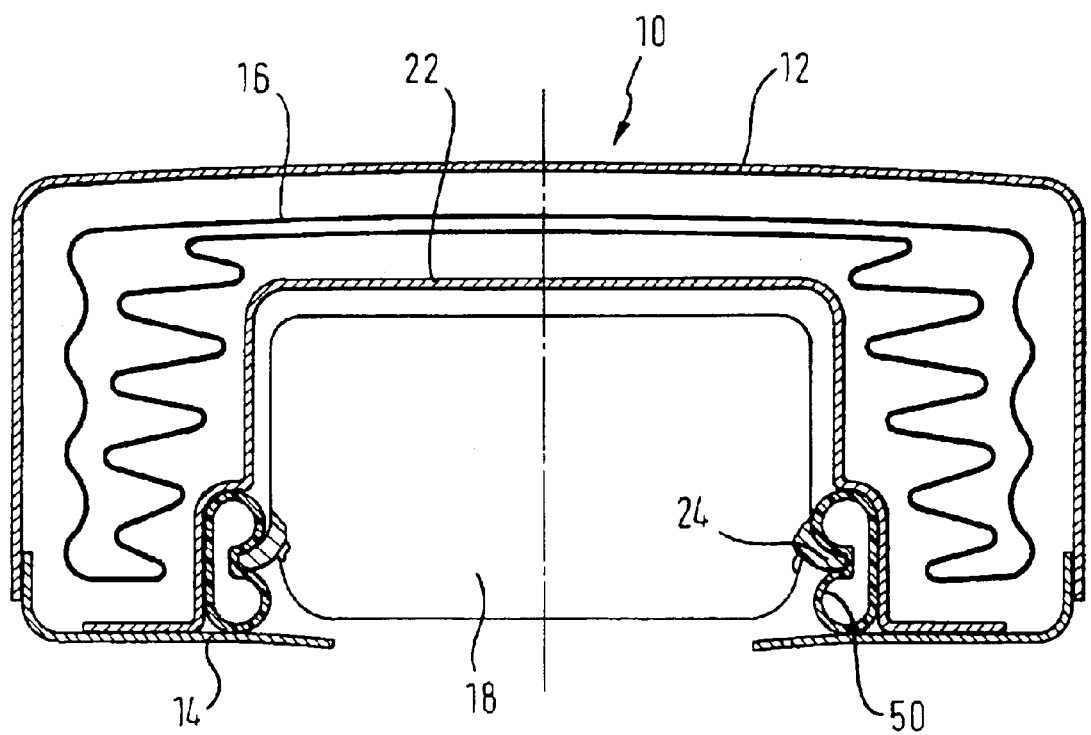
FIG. 2 shows a cross-sectional view of a gas generator according to the invention in a second embodiment.

The embodiment according to FIG. 2 differs from the one according to FIG. 1 only through the configuration of the elastic element, with according to FIG. 2, only one single elastic element 50 being provided which extends from the upper side of the holding flange 24 and along the outer circumferential edge all the way to the lower side of the holding flange 24. In the area of the circumferential edge, the elastic element 50, which is likewise ring-shaped and whose hollow profile has a closed cross-section, receives an indentation that is oriented radially outwards. In this embodiment as well, the gas generator 18 is supported in the module by the elastic element 50 by means of a clamping effect of the holding flange 24 between sections of the elastic element 50 so as to be uncoupled in terms of vibration. For this purpose, as in FIG. 1, the diffuser 22 presses the elastic element 50 downwards in the direction to the generator holding plate 14 which, like the diffuser 22, forms a holding part for the gas generator 18 and for the elastic element(s) 50 and 26, 28, respectively.

In both embodiments, each elastic element 26, 28, 50 not only has the function of mounting the gas generator 18 so as to be uncoupled in terms of vibration but also the function of preventing gas from escaping along the holding flange 24, through the gap between the holding flange 24 and the diffuser 22 as well as between the holding flange 24 and the holding plate 14. The reason is that this gap is closed gas-tight by the elastic elements 26, 28, 50 so that the gas cannot escape from the rear side of the module 10 but rather can only flow into the inside of the airbag 16 via the diffuser 22.

Figure 3A:
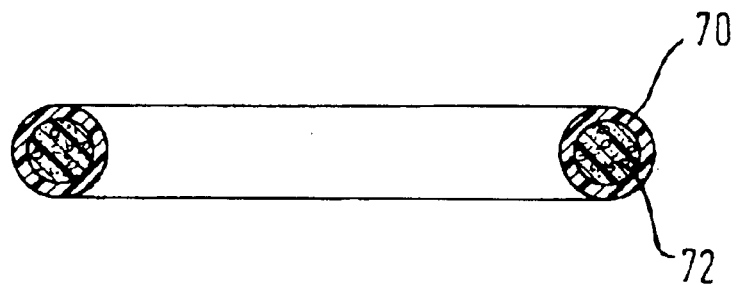
FIGS. 3a to 3c show cross-sectional views of various elastic elements.
Figure 3B:
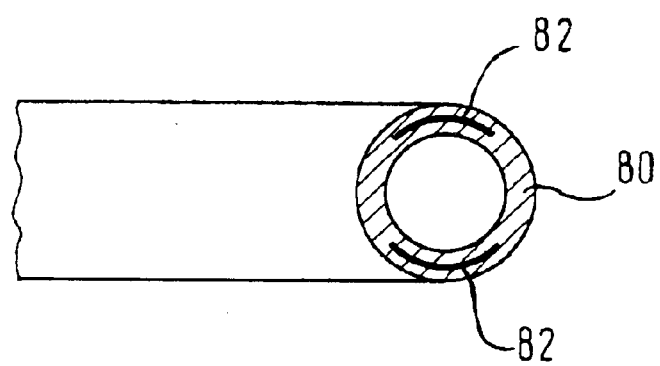
Figure 3C:
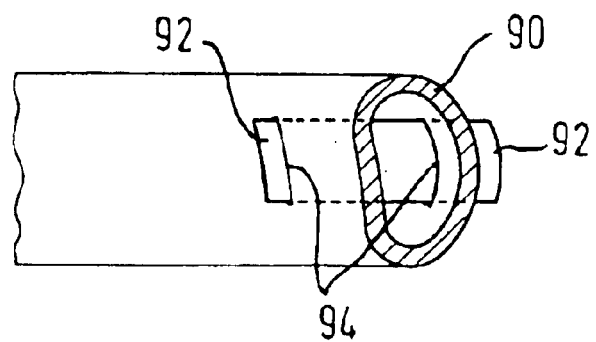

FIGS. 3a through 3c show several variants of the elastic element with which the elastic element acquires a higher stability as a result of additional means.

In the embodiment according to FIG. 3a, the inside of the elastic element 70 is foam-filled, the foam being designated by the reference numeral 72. The elastic element 80 according to FIG. 3b has two circumferential elastic support elements 82 the cross-sections of which are shell-shaped and which were inserted during the production of the elastic element 80. In the embodiment according to FIG. 3c, the elastic element 90 has openings on its circumferential wall in the form of slits through which strip-like support elements 92 have been inserted from a radially outer side.

In all of the embodiments, the elastic elements are made of an elastomer.

I claim:

1. An airbag module comprising a holding part and a gas generator including a cylindrical, circumferential flange, said gas generator being mounted to said holding part via said flange by means of at least one ring-shaped elastic element,
said ring-shaped elastic element being a hollow profile closed as seen in cross-section and extending along said flange so that said gas generator is circumscribed by said elastic element, said elastic element having a circumferential wall, a radial outer side of which lying against said gas generator on the one hand, and against said holding part on the other hand.

2. The airbag module according to claim 1, wherein said elastic element surrounds said gas generator.

3. The airbag module according to claim 1, wherein said elastic element seals off a gap between said holding part, which said gas generator is assembled, and said gas generator.

4. The airbag module according to claim 1, wherein said elastic element has the shape of a circumferentially closed ring.

5. The airbag module according to claim 1, wherein said elastic element is foam-filled.

6. The airbag module according to claim 1, wherein at least one elastic support element is incorporated in said elastic element, in order to increase the stability of said elastic element.

7. The airbag module according to claim 6, wherein said support element is inserted into said elastic element.

8. The airbag module according to claim 6, wherein said support element is slid into openings of said elastic element.

9. The airbag module according to claim 1, wherein said elastic element assumes a circular cross-section in a non-installed state.

10. The airbag module according to claim 1, wherein said gas generator has a holding flange comprising upper and lower sides, with one elastic element each lying against said upper and lower sides, respectively, and wherein another holding part is provided, and the holding parts pressing said elastic elements towards each other, in order to clamp said holding flange.

11. The airbag module according to claim 1, wherein said gas generator has a holding flange and said elastic element extends from an upper side of said holding flange and along a circumferential edge of said holding flange as far as to a lower side of said holding flange, and wherein holding parts are provided by means of which said elastic element is pressed against said upper and lower sides, in order to clamp said holding flange.

12. The airbag module according to claim 10, wherein one of said holding parts is a pot-shaped diffuser that surrounds said gas generator.

13. The airbag module according to claim 11, wherein one of said holding parts is a pot-shaped diffuser that surrounds said gas generator.

14. The airbag module according to claim 1, wherein said gas generator has an axial middle axis and a longitudinal axis of said elastic element extends at a right angle to said axis of said gas generator and around it.

* * * * *